May 12, 1936. J. B. WHITTED 2,040,193
DASH CONTROL VALVE
Filed Jan. 22, 1932
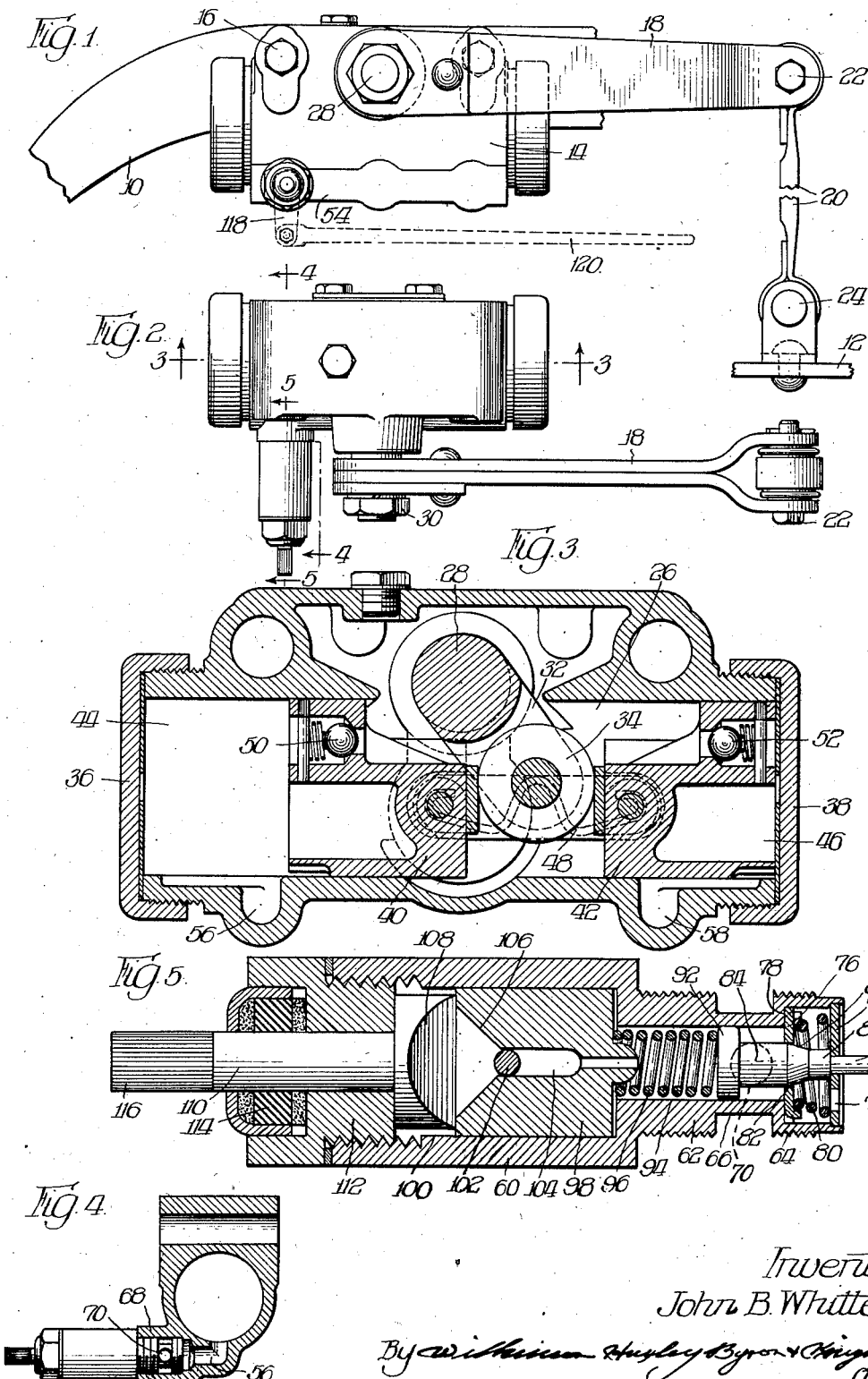
Inventor:
John B. Whitted, Patented May 12, 1936

2,040,193

UNITED STATES PATENT OFFICE 2,040,193

DASH CONTROL VALVE

John B. Whitted, Chicago, Ill., assignor, by mesne assignments, to Houde Engineering Corporation, Buffalo, N. Y., a corporation of New York Application January 22, 1932, Serial No. 588,060

3 Claims. (Cl. 188—88)

This invention relates to improvements in an adjustable dash control valve for a shock absorber whereby the operator of a motor vehicle may adjust the effect of the shock absorber in accordance with the conditions of the road over which the vehicle is traveling.

It is an object of the invention to provide a unitary assembly of a shock absorber controlling valve and an adjusting member for the valve which may be readily attached to the shock absorber.

It is further an object of the invention to provide a housing containing a pressure-operated shock absorber valve having resilient means normally holding the valve in seated position and to provide relatively rotatable camming members within the housing which may be adjusted from the exterior of the housing to vary the strength of the resilient means acting upon the valve.

Further and additional objects and advantages of the present improvements will be more readily apparent from the following description taken in connection with the attached drawing, in which Figure 1 is a side elevation showing a shock absorber mounted upon the vehicle chassis and connected to an axle or any portion of the vehicle which is not supported by the spring;

Figure 2 is a plan view of the shock absorber;

Figure 3 is an enlarged section taken on the plane indicated 3—3 in Figure 2;

Figure 4 is a transverse section taken on the plane indicated 4—4 in Figure 2 having the valves removed; and Figure 5 is an enlarged section taken on the plane indicated 5—5 in Figure 2.

A portion of the chassis of the vehicle is shown at 10. The part 12 is rigid with respect to an axle of the vehicle. The shock absorber housing 14 is secured to the chassis 10 by bolts 16. The operating arm 18 of the shock absorber is connected by a link 20 to the part 12 through a pivot connection 22 between the link 20 and the arm 18 and a pivot connection 24 between the link 20 and the part 12. The shock absorber has a central fluid chamber 26 and a rock shaft 28 is supported by the walls of the shock absorber housing 14 and extends through the chamber 26. The shaft 28, at one end, is connected to the lever arm 18 by nut 30. The shaft 28 within the chamber 26 has a yoke arm 32 carrying a roller 34.

The housing 14 has a cylindrical chamber closed at its ends by the caps 36 and 38. A pair of pistons 40 and 42 are slidable within the cylindrical chamber and separate the ends 44 and 46 from the central chamber 26. The shock absorber construction, as disclosed, is similar to that disclosed in my co-pending application, Serial No. 582,686, filed December 23, 1931, and it is to be understood that the pistons 40 and 42 are yieldably connected by spring members 48 and are held in thrust engagement with the roller 34, whereby a rockable movement of the shaft 28 serves to move the pistons simultaneously in either direction. The pistons carry check valves 50 and 52 which open in one direction to permit flow of fluid from the central chamber 26 to the end chambers 44 and 46 but prevent return flow. The end chambers 44 and 46 are connected by passageway 54 communicating with transverse passages 56 and 58, as shown in Figure 3. The flow of the fluid through the passage 54, upon movement of the pistons, is variably controlled by pressure-operated valve means and it is a feature of the present invention that the effectiveness of the pressure-operated valve means may be modified by adjustment from the exterior of the shock absorber housing.

A housing member 60 has a reduced threaded extension 62, the threaded portion 64 of which is divided by an annular cut-away portion 66. The housing 60 is adapted to be threaded into a boss 68 of the shock absorber housing, as shown in Figure 4, whereby the fluid may flow from passage 56 into the open inner end of the housing 60 and through an opening 70 into the annular groove formed by the cut-away portion 66, from which the fluid may flow through the passage 54 to the opposite end of the shock absorber. The fluid may also flow in the opposite direction but the flow of the fluid in either direction is adapted to be controlled by pressure-operated valve means.

The inner end of the housing 60 has pressed thereinto a disk 72 having fluid flow openings 74. A disk valve 76 is positioned within the housing 60 and adapted to seat upon a shoulder 78 through the pressure of a spring 80 reacting between the disk member 72 and the valve 76. Pressure of the fluid tending to flow from the right-hand end of the shock absorber to the left-hand end will tend to unseat the disk valve 76 and some of the fluid may flow around the marginal edges thereof. The valve 76 also has a central circular opening 82 through which the fluid may flow, except as restricted by the valve stem member 84, which has a conical portion 86 protruding through the opening 82 in the valve disk 76. The valve member 84 has a shoulder 88 seating upon the disk 72 and has a guide pin 90 extending through the disk 72. The valve member 84 is guided at its outer end by a head 92 fitting within the cylindrical chamber 94 of the housing 60.

The valve member 84 is normally pressed into seated position by a spring 96 which reacts at its outer end upon an adjustable head 98 which is received in an enlarged cylindrical portion 100 of the housing 60 and is held against rotation by a cross pin 102 fitting into a slotted portion 104 cut through the head 98. The head 98 forms a cam member through the provision of a V-shaped cleft 106 at its outer end and is pressed against a relatively rotatable V-shaped cam member 108. The cam member 108 has a stem 110 extending through a cap member 112 which is threaded into the open outer end of the housing 60. Suitable sealing means 114 may be provided for preventing escape of fluid past the stem 110. The stem 110 has a serrated end 116 which may have secured thereto a lever 118 and operating rod 120, as diagrammatically shown in Figure 1.

It is to be understood that normally the disk valve 76 is held in seated position by the spring 80 and the valve stem 84 is held in seated position by the spring 96. Also, the slidable cam head 98 is pressed outwardly by the spring 96 against the camming member 108 which seats against the shouldered inner end of the end cap 112. Upon bound movement of the vehicle towards the axle, the lever arm 18 will rotate in a counter-clockwise direction thereby moving the pistons 40 and 42 towards the right-hand end of the shock absorber. This movement will tend to force the fluid from the right-hand end of chamber 46 through the fluid passage 54 into the annular groove 56 and then through the opening 70 into the interior of the housing 60 where the fluid pressure will react against the disk valve 76. The fluid pressure if sufficient to unseat the disk valve 76 will cause flow of the fluid around the marginal edges of the disk valve 76 and also through the central opening of the disk valve. The area for flow through the central opening of the disk valve will become increasingly greater as the disk valve is moved farther and farther from its seat, due to the conical portion 86 on the valve stem 84.

Upon rebound of the vehicle body away from the axle, the pistons will be moved in the opposite direction towards the left-hand end of the shock absorber. The disk valve 76 will be seated but the fluid pressure will tend to move the valve stem 84 against the resistance of the spring 96. In this direction of fluid flow, the fluid may only flow through the central opening of the disk valve in accordance with the increasing area of opening as the valve stem 84 is moved farther and farther from its seated position. By rotating the adjustable camming member 108, the V-shaped end will enter the V-shaped cleft in the slidable head 98 thereby permitting expansion of the spring 96 and decreasing the force which the spring 96 exerts upon the valve stem 84. It is therefore obvious that the operator can control the rebound vehicle movement by suitably adjusting the camming member 108 in accordance with the road conditions.

The lever 118 and pull rod 120, diagrammatically indicated in Figure 1, illustrate the manner in which the operator can adjust the shock absorber from the operator seat of the vehicle.

I claim:

1. In combination with a shock absorber having a fluid flow passage through which the fluid may flow in either direction, a valve disk arranged to seat against the pressure of the fluid in one direction, resilient means for normally holding said valve disk in seated position, a movable valve stem extending through said valve disk and arranged to seat against the pressure of the fluid flowing in the opposite direction, resilient means for normally holding said valve stem in seated position and means adjustable from the exterior of the shock absorber for varying the effect of said last-mentioned resilient means.

2. In combination with a shock absorber, an adjustable control valve assembly comprising a housing having a fluid flow passage therethrough, a valve member arranged to seat against flow of the fluid in one direction therethrough, resilient means for holding said valve member in normally seated position, a second valve member extending through said first valve member and arranged to seat against said housing in the opposite direction from said first valve member, resilient means reacting upon said second valve member to hold said second valve member in normal seated position and means adjustable from the exterior of said housing for varying the effective strength of at least one of said resilient means.

3. In combination with a shock absorber, an adjustable control valve assembly therefor comprising, a housing having a fluid flow passage therethrough, a movable valve member within said housing cooperating with said fluid flow passage, a slidable abutment member in said housing, a compression spring reacting between said abutment member and said valve member and means preventing rotation of said abutment member with respect to said housing, a removable end cap for said housing, and a rotatable camming member supported by said end cap and engaging said abutment member within said housing whereby rotation of said camming member will permit slidable movement of said abutment member to vary the effective compression of said spring.

JOHN B. WHITTED.